United States Patent [19]

Schlegel

[11] 3,757,742
[45] Sept. 11, 1973

[54] PURPLE MARTIN BIRDHOUSE

[75] Inventor: William Schlegel, Cranbury, N.J.

[73] Assignee: Pen-Cell Plastics Inc., Hamilton Square, N.J.

[22] Filed: Oct. 20, 1971

[21] Appl. No.: 191,034

[52] U.S. Cl. .............................................. 119/23
[51] Int. Cl. .......................................... A01k 31/00
[58] Field of Search .......................... 119/17, 19, 23; 46/19

[56] References Cited
UNITED STATES PATENTS

| | | | |
|---|---|---|---|
| 3,696,792 | 10/1972 | Bruhns | 119/23 |
| 3,478,722 | 11/1969 | Falcone et al. | 119/23 |
| 3,418,976 | 12/1968 | Vail | 119/23 |
| 3,496,913 | 2/1970 | Vail | 119/23 |
| 3,244,148 | 4/1956 | Long | 119/23 |
| 3,078,826 | 2/1963 | Bear | 119/23 |
| 3,111,934 | 11/1963 | Vail | 119/23 |
| 2,951,312 | 9/1960 | Engh | 46/19 |
| 2,061,712 | 11/1936 | Martin | 119/17 X |

Primary Examiner—Louis G. Mancene
Assistant Examiner—James H. Czerwonky
Attorney—Albert Sperry et al.

[57] ABSTRACT

A birdhouse is herein provided comprising a vertically split structure having at least two separate components. Each component presents a portion of a chimney extending from a roof portion of the structure. A removable clamping member, in the nature of a chimney cap, is secured to the outer, upper marginal edges of the chimney to urge the components of the vertically split structure horizontally together. The components are further formed to present a downwardly extending collar portion for axially receiving a birdhouse supporting post. The collar, which is of an axially split configuration due to the vertically split nature of the overall structure, may be clamped by a removable strap or the like to frictionally engage the cylindrical surface of the post. In one feature of the invention, an upper marginal surface of the chimney is formed with a plurality of protuberances to hold the chimney cap in spaced relationship to the marginal edge of the chimney to define a ventilation path from inside the birdhouse through the chimney and out under the chimney cap.

10 Claims, 3 Drawing Figures

PATENTED SEP 11 1973
3,757,742
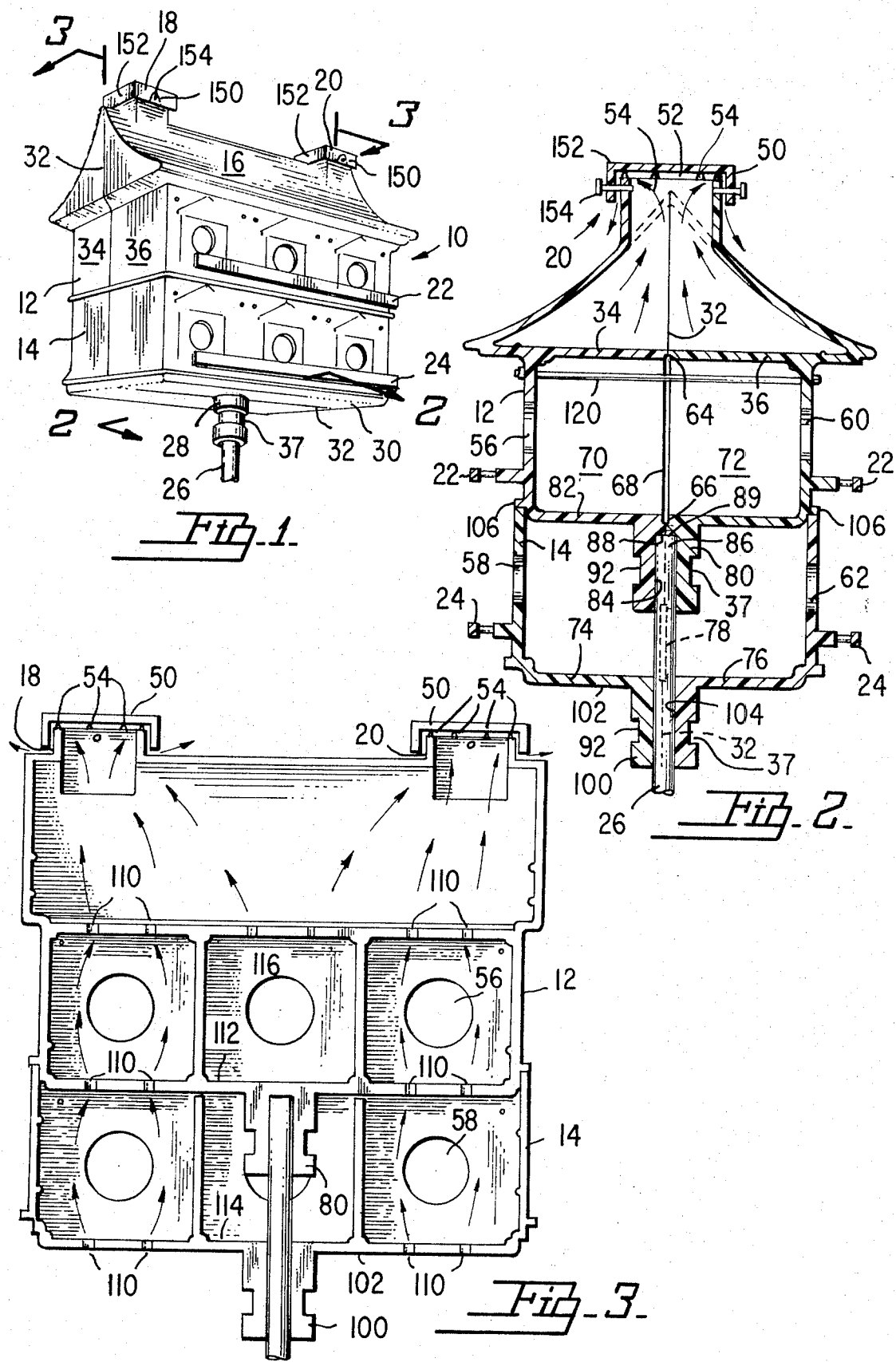

PURPLE MARTIN BIRDHOUSE

BACKGROUND OF THE INVENTION

The invention relates to birdhouses and, more specifically, relates to a multi-compartment, multi-tiered birdhouse particularly adapted for use by the Purple Martin.

It has become beneficial to encourage certain birds to congregate in numbers. This is particularly true with respect to Purple Martins because of the great numbers of insects, such as mosquitoes, these birds consume each season. In fact, many municipalities suggest that property owners take steps to encourage the Purple Martin to locally collect in numbers in order to reduce insect concentrations and to help reduce the health hazards resulting from the excessive use of spray insecticides. The Purple Martin prefers to dwell in colonies and to inhabit multiple apartment dwellings.

The birdhouse of the present invention has been specifically designed with the Purple Martin in mind and is intended to provide a birdhouse that is pleasing to the eye, easy to assemble, and effective in attracting these birds as occupants.

The Purple Martin is a gregarious species and is a prodigious and effective destroyer of flying insects, expecially the mosquito. Martins will catch these flying insects while on the wing and immediately return to the birdhouse to feed the insects to their young. The average Martin has been known to destroy upwardly of two thousand mosquitoes daily in this manner.

As the public becomes more aware of the beneficial nature of this bird, various organizations and civic groups have embarked upon campaigns to erect birdhouses in the hope of attracting colonies of Martins to residential areas to aid in insect control.

The Purple Martin is a vigorous and energetic bird and is quite particular as to the construction of the birdhouse it chooses to occupy. The Martin will winter in the equatorial regions; migrate north for the summer months; and, if the birdhouse is suited to its liking, will return year after year to the same house.

Observance of these birds indicates that the Martin abhors overcrowded conditions and prefers individual apartments which are free of foreign debris. Therefore, it is important that such birdhouses be easily cleanable. This is an important and desirable feature, since Martins will not nest if the compartments are not clean and spacious, or, if sparrows or other not-migratory birds occupy any of the other nesting compartmens of the birdhouse. Thus, birdhouse owners are, by necessity, required to make repeated inspections to assure the cleanliness of the birdhouse and to remove the nests of undesirable occupants.

The property owner may fabricate a birdhouse to his own liking, or there are many types and forms of birdhouses that can be purchased on the open market, including the multiple dwelling type. Typically, birdhouses generally included within the multiple dwelling type are erected from a myriad of separate pieces secured together by fasteners or by the use of tools. Accordingly, such multiple dwelling birdhouses are expensive and require the consumption of appreciable time for their erection.

OBJECTS AND SUMMARY OF THE INVENTION

It is therefore an object of the present invention to provide a birdhouse construction which is particularly adaptable and attractive to the Purple Martin.

It is another object of the present invention to provide a birdhouse structure, the assembly of which, is uniquely simplified.

It is yet another object of the present invention to provide a multi-tier birdhouse which is formed so that additional tiers may be added without removing any existing structure.

It is still another object of the present invention to provide a multi-dwelling birdhouse having better ventilation characteristics than existing such birdhouses.

It is a further object of the present invention to provide a multiple dwelling birdhouse which may be easily cleaned so as to be kept attractive for occupancy by the Purple Martin.

It is still a further object of the present invention to provide a multiple dwelling birdhouse which solves many of the problems attending existing such birdhouses.

At least some of the above cited objects are achieved by the provision of a birdhouse comprising a vertically split structure having at least two components. Securing devices are provided for urging the components horizontally together to form the overall birdhouse structure.

In one feature of the invention, a chimney is formed by the cooperation of the various components which may be urged together by a chimney cap clamped across the upper marginal edges of the chimney.

In another feature of the present invention, the chimney cap is supported to be spaced from the marginal edges of the chimney so as to provide a ventilation path from the interior of the birdhouse to the ambient.

In still another feature of the present invention, additional tiers may be added without removing an existing birdhouse, which tiers also comprise a vertically split structure.

BRIEF DESCRIPTION OF THE DRAWINGS

While the invention is particularly pointed out and distinctly claimed in the concluding portion of the specification, a preferred embodiment is set forth in the following detailed description which may be best understood when read in conjunction with the accompanying drawings in which:

FIG. 1 is a perspective view of a multi-dwelling, multi-tiered birdhouse according to the present invention;

FIG. 2 is a transverse sectional view taken in elevation along line 2-2 through the birdhouse of FIG. 1; and FIG. 3 is a longitudinal, sectional view taken in elevation along line 3-3 of the birdhouse of FIG. 1.

DETAILED DESCRIPTION OF THE PREFERRED EMBODIMENT

Referring now to the drawings in which like numerals are used to indicate like parts throughout the various views thereof, FIG. 1 shows an overall birdhouse structure 10 according to the present invention.

The structure 10 consists of molded sections of a suitable material such as a structural foam plastic. The overall structure includes tiers 12 and 14 having a roof 16 presenting chimneys 18 and 20 upwardly therefrom.

Perching balconies 22 and 24 extend outwardly from tiers 12 and 14, respectively. The overall structure may be supported on a vertical post 26 by insertion of the post within a collar member 28 extending downwardly from a lower surface 30 of the birdhouse structure.

It will be noted that the overall structure 10 is vertically split along the line 32 to form components 34 and 36. Since each of the components 34 and 36 contribute a portion of the cylindrical wall comprising the collar 28, the collar is also vertically split along the line 32. A metallic strap 37 or a similar device may then be used to urge the collar member 28 into frictional engagement with the post 26 for the proper mounting of the birdhouse.

FIG. 2 is a transverse sectional view of the birdhouse shown in FIG. 1 taken along line 2—2.

As can be seen, a capping member 50 fits over the marginal edge 52 of the chimney 20. Upwardly extending protuberances 54 are operable to space the cap 50 from the marginal edge 52 of the chimney so as to provide a ventilation duct from the interior of the birdhouse upwardly from the interior 20 and out to the ambient.

FIG. 2 shows the multi-tier construction wherein individual tiers 12 and 14 are formed with bird access openings 56, 58, 60 and 62. The components 34 and 36 may be provided with notches to form longitudinally extending recesses 64 and 66 for receiving and retaining a longitudinal partition 68 for dividing the tier 12 transversely to form apartments, e.g. 70 and 72.

The lower tier 14 also comprises a split structure having components 74 and 76. Recesses may be provided for retaining a longitudinal partition 78 in the same manner as the partition 68 is retained in tier 12.

A collar 80 extends downwardly from the lower surface 82 of tier 12. The collar 80 may be formed to define a cylindrical recess 84 for axially receiving the wall 86 of the supporting post 26. Radially extending wall 88 partially defining the recess 84 of the collar 80 is in abutting relationship with the upper terminal end 89 of the supporting post 26. The metallic strap 37, or the like, may be fitted within an annular groove 92 formed about the collar portion 80 and is operable to tighten the split collar 80 into frictional engagement with the upper cylindrical surface of the post 26.

A second collar 100 extends downwardly from the lower surface 102 of tier 14 in a manner similar to the split collar 80 of tier 12. Furthermore, a similar metallic clamping strap 37 may be retained within a similar annular groove 92.

Despite the similarities between the collars 80 and 100, however, the recess 104 formed within the collar 100 is different from the recess 84 formed within the collar 80 in that the recess 104 extends entirely through the axial end of the collar 100 so that the post 26 may extend entirely through the tier 14 for axial insertion within the recess 84 of collar 80.

Due to the arrangement of the second tier 14, the strap member 37 may be moved from the collar 100 and the two components 74 and 76 comprising tier 14 may be removed from the overall structure without disturbing the remaining structure. This is especially helpful when disassembling or assembling the structure for cleaning purposes.

The upper marginal edges of tier 14 may be arranged to engage flanges 106 extending laterally from tier 12 so as to provide a more integrated structure.

FIG. 3 is an elevational view taken along line 3-3 showing the structure of FIG. 1 along the longitudinal extension thereof. It will be noted, that ventilation holes 110 may be provided in the floor portions 112 and 114 of tiers 12 and 14, respectively. Furthermore, the ventilating holes 110 may be formed in the ceiling 16 of tier 12 so that air may circulate from beneath the birdhouse, through the birdhouse and out the chimney structure as particularly shown in FIGS. 2 and 3. Also, it should be noted that the holes 110 formed in the floors 112 and 114 operate to drain any liquids from inside the birdhouse to the ground below the structure.

As shown in FIG. 2, a bolt member 120 may be secured transversely of the birdhouse to assist in urging the two vertically oriented components 34 and 36 into horizontal engagement.

Notches 150 may be formed in a downwardly extending skirt portion 152 of the cap 50 to receive horizontally extending screw members 154 provided to position the cap 50.

It can thus be seen that a multiple dwelling birdhouse is herein provided which may be more easily assembled and disassembled than existing such birdhouses.

The birdhouse according to the present invention lends itself to a more aesthetic design than birdhouses heretofore known. The ventilation scheme embodied in the present invention provides an environment particularly suitable to the valuable Purple Martin. The facility with which the birdhouse may be assembled or disassembled permits regular cleanings of the birdhouse which, once again, makes the birdhouse particularly suitable for the finicky Purple Martin.

The vertical split feature of the structure according to the present invention permits the incorporation of additional tiers as the Purple Martin colony grows. Of course, the more birds that may be encouraged to join the colony, the more effective is the insect control in the area surrounding the colony.

SCOPE OF THE INVENTION

While what has been shown herein is a preferred embodiment of the present invention, it is, of course, understood that various modifications and changes may be made therein without departing from the invention. Therefore, it is intended to cover in the following claims all such modifications and changes as they fall within the true spirit and scope of the present invention.

What I claim is:

1. A birdhouse comprising a vertically split structure having at least two separate components, and including a chimney having generally upwardly extending side portions, said components each incorporating a portion of said chimney, and removably mounted securing means cooperatively interacting with said chimney portions and with the remainder of said structure for urging said components horizontally together.

2. A birdhouse according to claim 1 wherein each of said components is formed to define a portion of said chimney; and said securing means includes a cap operable to clamp the portions of said chimney together to form said chimney and to urge said components horizontally together to form the overall structure.

3. A birdhouse according to claim 2 wherein an upper marginal edge of said chimney is formed with protuberance means for maintaining said cap in spaced relationship with respect to said chimney; and said chimney defines a ventilation duct extending from within the interior of said birdhouse, through a roof portion thereof, to the ambient.

4. A birdhouse according to claim 3 wherein projection means extend horizontally from said chimney and notch means is formed in a skirt portion of said chimney cap to receive said projection means for positioning said chimney cap.

5. A birdhouse according to claim 4 wherein said projection means comprises threaded fastening means.

6. A birdhouse according to claim 1 wherein said birdhouse is a multiple tiered bird dwelling, with additional tiers being removably attachable.

7. A birdhouse according to claim 6 wherein each said additional tier comprises a vertically split structure having removable securing means for urging the components of said structure horizontally together about a supporting, vertically extending post.

8. A birdhouse according to claim 7 wherein said components of each said additional tier form a split collar member which may be clamped around an existing birdhouse supporting post;

whereby said additional tiers may be added to the bottom of an existing birdhouse structure supported on a post without removing or otherwise disturbing the existing structure.

9. A birdhouse according to claim 8 wherein said removable securing means includes a strap member removably tightened around a split collar member formed by a portion of each of the components of said vertically split structure with a supporting post inserted axially within a cylindrical recess formed by said split collar member.

10. In the birdhouse as recited in claim 1, each of said components being formed to define a portion of said chimney and wherein said securing means includes a cap operable to clamp the portions of said chimney together to form said chimney and to urge said components horizontally together to form the overall structure, the upper marginal edge of said chimney being formed with protuberance means for maintaining said caps in spaced relationship with respect to said chimney, said chimney defining a ventilation duct extending from within the interior of said birdhouse, through a roof portion thereof to the ambient, projection means extending horizontally from said chimney and notch means formed in a skirt portion of said chimney cap to receive said projection means for positioning said chimney cap, wherein said birdhouse is a multiple tiered dwelling, additional tiers being removably attachable, each additional tier having vertically split structure having removable securing means for urging the components of said structure horizontally together about a supporting vertically extending post, and said components of each said additional tier forming a split collar member which may be clamped around an existing supporting post, whereby said additional tiers may be added to the bottom of an existing birdhouse structure on a post without removing or otherwise disturbing the existing structure.

* * * * *